(12) United States Patent
Liwei

(10) Patent No.: US 11,230,314 B2
(45) Date of Patent: Jan. 25, 2022

(54) BABY STROLLER FRAMES

(71) Applicant: Artsana S.p.A., Grandate (IT)

(72) Inventor: Yi Liwei, Zhongshan (CN)

(73) Assignee: ARTSANA S.P.A., Grandate (IT)

( * ) Notice: Subject to any disclaimer, the term of this patent is extended or adjusted under 35 U.S.C. 154(b) by 104 days.

(21) Appl. No.: 16/825,507

(22) Filed: Mar. 20, 2020

(65) Prior Publication Data
US 2020/0298899 A1    Sep. 24, 2020

(30) Foreign Application Priority Data
Mar. 21, 2019  (CN) .......................... 201920369519.5

(51) Int. Cl.
*B62B 7/08* (2006.01)
*B62B 7/06* (2006.01)
*B62B 7/10* (2006.01)

(52) U.S. Cl.
CPC ................ *B62B 7/08* (2013.01); *B62B 7/068* (2013.01); *B62B 7/10* (2013.01); *B62B 2205/20* (2013.01); *B62B 2205/26* (2013.01)

(58) Field of Classification Search
CPC .. B62B 7/08; B62B 7/068; B62B 7/10; B62B 7/06; B62B 2205/20; B62B 2205/26
See application file for complete search history.

(56) References Cited

U.S. PATENT DOCUMENTS

| | | | | |
|---|---|---|---|---|
| 6,666,473 B2* | 12/2003 | Hartenstine | ............ | A47D 13/06 280/642 |
| 7,780,183 B2* | 8/2010 | Chen | ........................ | B62B 7/08 280/647 |
| 9,540,027 B1* | 1/2017 | Hanson | .................... | B62B 7/086 |
| 10,286,940 B2* | 5/2019 | Chen | ........................ | B62B 7/068 |
| 10,414,424 B2* | 9/2019 | Yuan | ........................ | B62B 9/20 |

* cited by examiner

*Primary Examiner* — John D Walters
(74) *Attorney, Agent, or Firm* — MH2 Technology Law Group LLP

(57) ABSTRACT

The present disclosure provides a baby stroller frame, comprising: a front leg rod, a front wheel connected to a lower end of the front leg rod; a rear leg rod, a rear wheel connected to a lower end of the rear leg rod, an upper end of the front leg rod being rotatably connected with an upper end of the rear leg rod; a handle set comprising a rear link rod, the rear link rod is rotatably connected to the rear leg rod at a position that is on the rear link rod and is close to an lower end of the rear link rod; a front support rod comprising a first link rod and a second rod slidably connected to the first link rod, the first link rod being rotatably connected to the upper end of the rear leg rod or to the upper end of the front leg rod, the second link rod being rotatably connected to the rear link rod; a seat rod having one end rotatably connected to the rear link rod and one other end rotatably connected to a middle portion of the front leg rod; the stroller frame according to the present disclosure is provided with an easy folding mechanism that allows for a quick folding configured to realize one-click quick folding and automatically standing, thereby enabling convenient operations of taking away and putting down, meanwhile reducing the production cost and improving the user experience.

9 Claims, 7 Drawing Sheets

BABY STROLLER FRAMES

CROSS-REFERENCE TO RELATED APPLICATION(S)

This application claims priority under 35 U.S.C. § 119 from Chinese Utility Model Application No. 201920369519.5, filed on Mar. 21, 2019, in the China National Intellectual Property Administration ("CNIPA"), the entire contents of which are incorporated herein by reference.

TECHNICAL FIELD

The present disclosure relates to the field of baby strollers, in particular to a baby stroller frame.

BACKGROUND

Baby stroller has become a necessity during the growth of infants. Most of the baby strollers on the market at present are foldable, which are easy to carry and can be placed in the truck of a vehicle or the luggage rack of an airplane, reducing the burden of people going out carrying their babies. However, conventional baby strollers have relatively complicated frame structure that is extremely difficult to be folded and that cannot stand when folded. Currently, the market has products configured to automatically fold and unfold. Such products require to add a drag spring, a torque spring, etc. to the stroller frame to drive the stroller frame to fold, which causes great difficulty for unfolding the chassis and is inconvenient to operate.

The present disclosure is proposed to address the above problem.

SUMMARY

To address the deficiency of the prior art, the present disclosure proposes a baby stroller frame provided with an easy folding mechanism that allows for a quick folding.

The stroller of the present disclosure is configured to realize one-click quick folding and automatically standing, thereby enabling convenient operations of taking away and putting down, meanwhile reducing the production cost and improving the user experience.

In order to solve the above technical problem, the present disclosure provides the technical solution of a baby stroller frame, comprising:

a front leg rod, a front wheel connected to a lower end of the front leg rod, a rear leg rod, a rear wheel connected to a lower end of the rear leg rod, an upper end of the front leg rod being rotatably connected with an upper end of the rear leg rod, a handle set comprising a rear link rod, the rear link rod is rotatably connected to the rear leg rod at a position close to a lower end of the rear link rod, a front support rod comprising a first link rod and a second link rod slidably connected to the first link rod, the first link rod being rotatably connected to the upper end of the rear leg rod or to the upper end of the front leg rod, the second link rod being rotatably connected to the rear link rod, a seat rod having one end rotatably connected to the rear link rod and one other end rotatably connected to a middle portion of the front leg rod.

According to an embodiment, the baby stroller frame comprises a locking assembly between the first link rod and the second link rod for mutually locking the first link rod and the second link rod. The locking assembly comprises a lock hole in the first link rod. The locking assembly further comprises a lock pin in the second link rod, which matches the lock hole. The baby stroller comprises a drive assembly, provided on the second link rod, which is configured to drive the lock pin to move in the lock hole.

According to an embodiment, the drive assembly comprises a slider block. The slider block comprises a sliding groove for the lock pin to slide therein. The slider block further comprises a chute through the sliding groove. The lock pin comprises a first column inserted into the chute. The slider block is connected at one end to a draw cord. The drive assembly further comprises a spring configured to drive the slider block to reset.

According to an embodiment, the baby stroller frame comprises a restriction block at the second link rod for preventing the second link rod from dropping off the first link rod. The restriction block comprises a runway for the slider block to slide therein. The slider block has a bar-shaped hole. The restriction block further comprises a second column inserted into the bar-shaped hole and connecting the slider block to the restriction block. The spring has one end fixed to the slider block and one other end abutting against the restriction block.

According to an embodiment, the handle set further comprises a U-shaped push rod rotatably provided on the upper end of the rear link rod.

According to an embodiment, the rear leg rod comprises a rear leg link rod and a protrusion portion provided on the middle portion of the rear leg link rod. The rear link rod is rotatably connected to the protrusion portion at a position close to the lower end of the rear link rod. The rear wheel is connected to the lower end of the rear leg link rod. The upper end of the rear leg link rod is connected to the upper end of the front leg rod.

According to an embodiment, the first link rod comprises at an end portion a stopper block which is configured to abut against the restriction block and to prevent the second link rod from dropping off the first link rod.

According to an embodiment, the handle set comprises a rotation seat between the push rod and the rear link rod. The other end of the draw cord is connected to the rotation seat.

According to an embodiment, the push rod comprises an unlocking member configured to unlock the locking assembly by causing the push rod to rotate with respect to the rear link rod to draw the draw cord.

Compared to the prior art, the baby stroller frame according to the present disclosure has the following advantageous effects.

After the baby stroller frame of the present disclosure is unlocked for folding, the push rod is pushed forward, so that the lower end of the push rod and the upper end of the rear link rod approach the lower end of the rear leg rod, and the draw cord pulls the slider block on the second link rod to slide relative to the first link rod. Due to gravity, the end of the second link rod connected to the rear link rod also approaches the lower end of the rear leg rod. The lower end of the rear link rod rotates to drive the seat rod to move. The other end of the seat rod drives the front lea rod to move towards the rear leg rod, thereby achieving the folding of the whole stroller. The folding process is simple to operate, realizing flexible folding and a smaller volume of the stroller after folding. More importantly, the locking assembly of the baby stroller frame of the present disclosure realizes locking and unlocking by the cooperation between the lock pin and the lock hole. Thus, the locking and unlocking actions are performed in a closed cavity, without exposure and eliminating the worry of injuring the fingers, which guarantees safety.

After the stroller of the present disclosure is folded, the stroller is configured to stand upright with the front wheel and the rear wheel as the bearing points, eliminating the need of bending over to make the stroller to stand upright, which saves body strength and is convenient for carrying.

When the baby stroller frame of the present disclosure is unlocked, by pressing the unlocking member on the push rod, the rotation seat is rotated to pull the draw cord, thereby driving the slider block to move. Thus, the spring is compressed, and the locking assembly is completely unlocked. Then, the stroller can be folded by pushing the push rod. The entire process realizes a one-hand operation with one press-and-push action, which is very convenient.

BRIEF DESCRIPTION OF THE DRAWINGS

The embodiments of the present disclosure are further described with reference to the attached drawings.

DETAILED DESCRIPTION

Figure 1:
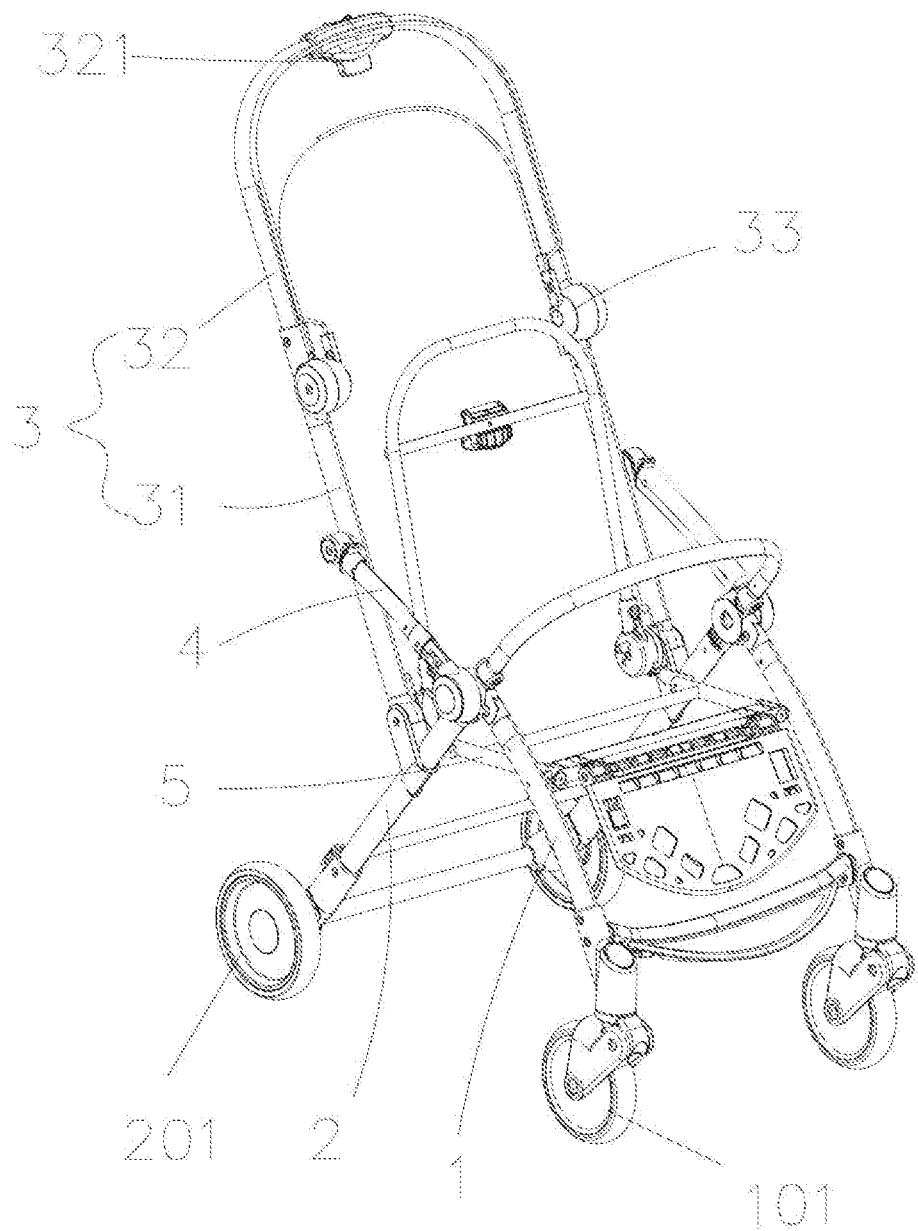
FIG. 1 shows an embodiment of the baby stroller frame according to the present disclosure in a deployed state.

The technical solution of the present disclosure is clearly and completely described with reference to the attached drawings of embodiments of the present disclosure.

As shown in FIGS. 1 to 7, the baby stroller frame of the present embodiment comprises:

a front leg rod 1, a front wheel 101 connected to a lower end of the front leg rod 1, a rear leg rod 2, a rear wheel 201 connected to a lower end of the rear leg rod 2, an upper end of the front leg rod 1 being rotatably connected with an upper end of the rear leg rod 2, a handle set 3 comprising a rear link rod 31, the rear link rod 31 being rotatably connected to the rear leg rod 2 at a position close to a lower end of the rear link rod 31, a front support rod 4 comprising a first link rod 41 and a second link rod 42 slidably connected to the first link rod 41, the first link rod 41 being rotatably connected to the upper end of the rear leg rod 2 or, alternatively, the first link rod 41 being rotatably connected to the upper end of the front leg rod 1, the second link rod 42 being rotatably connected to the rear link rod 31, a seat rod 5 having one end rotatably connected to the rear link rod 31 and one other end rotatably connected to a middle portion of the front leg rod 1.

According to an embodiment, the baby stroller frame comprises a locking assembly 6 provided between the first link rod 41 and second link rod 42 for mutually locking the first link rod 41 and second link rod 42. The locking assembly 6 comprises a lock hole 61 in the first link rod 41.

The locking assembly 6 further comprises a lock pin 62 in the second link rod 42, which matches the lock hole 61. The baby stroller frame comprises a drive assembly 7 provided on the second link rod 42. The drive assembly 7 is configured to drive the lock pin 62 to move in the lock hole 61.

According to an embodiment, the handle set 3 further comprises a U-shaped push rod 32 rotatably provided on the upper end of the rear link rod 31.

After the baby stroller frame is unlocked for folding, the push rod 32 is pushed forward, so that the lower end of the push rod 32 and the upper end of the rear link rod 31 approach the lower end of the rear leg rod 2, and the second link rod 42 slides relative to the first link rod 41, causing the end of the second link rod 42 connected to the rear link rod 31 to approach the lower end of the rear leg rod 2, too. The lower end of the rear link rod 31 rotates in a position where the rear link rod 31 is rotatably connected to the rear leg rod 2 to drive the seat rod 5 to move. The other end of the seat rod 5 drives the front leg rod 1 to approach the rear leg rod 2, thereby achieving the folding of the whole stroller. The folding process is simple to operate, realizing flexible folding and a smaller volume of the stroller after folding. More importantly, the locking assembly 6 of the baby stroller frame of the present disclosure realizes locking and unlocking by the cooperation between the lock pin 62 and the lock hole 61. Thus, the locking and unlocking actions are performed in a closed cavity, without exposure and eliminating the worry of injuring the fingers, which guarantees safety.

According to an embodiment, the drive assembly 7 comprises a slider block 71. The slider block 71 comprises a sliding groove 711 for the lock pin 62 to slide therein. The slider block 71 further comprises a chute 712 through the sliding groove 711. The lock pin 62 comprises a first column 713 inserted into the chute 712. The first column 713 inserted in the chute 712 allows the lock pin 62 to be slidable in the sliding groove 711. The drive assembly 7 further comprises a draw cord 72. The slider block 71 is connected to one end of the draw cord 72. The drive assembly 7 further comprises a spring 73 configured to drive the slider block 71 to reset. In the unlocking state, the slider block 71 moves toward the position where the second link rod 42 connects the rear link rod 31. The spring 73 is in a compressed state. When the stroller frame deploys, the upper end of the push rod 32 moves away from the rear link rod 31. Under the counterforce of the spring 73, the slider block 71 moves toward the direction of the first link rod 41 so that the lock pin 62 slides in the chute 712 into the lock hole 61.

According to an embodiment, the baby stroller frame further comprises a restriction block 8 at the second link rod 42 for preventing the second link rod 42 from dropping off the first link rod 41. The restriction block 8 comprises a runway 81 for the slider block 71 to slide therein. The slider block 71 has a bar-shaped hole 714. The restriction block 8 further comprises a second column 82 inserted into the bar-shaped hole 714 and connecting the slider block 71 to the restriction block 8. The spring 73 has one end fixed to the slider block 71 and one other end abutting against the restriction block 8.

According to an embodiment, the rear leg rod 2 comprises a rear leg link rod 21 and a protrusion portion 22 provided on the middle portion of the rear leg link rod 21. The rear link rod 31 is rotatable connected to the protrusion portion 22 at a position close to the lower end of the rear link rod. The rear wheel 201 is connected to the lower end of the rear lea link rod 21. The upper end of the rear lea link rod 21 is connected to the upper end of the front leg rod 1.

According to an embodiment, the first link rod 41 comprises at an end portion a stopper block 411 which is configured to abut against the restriction block 8. The stopper block 411 acts as a restriction as the restriction block 8 at the second link rod 42 stops moving at the stopper block 411. The restriction block 8 is also configured to prevent the second link rod 42 from dropping off the first link rod 41.

According to an embodiment, the baby stroller frame comprises a rotation seat 33 between the push rod 32 and the rear link rod 31. The other end of the draw cord 72 is connected to the rotation seat 33. When the push rod 32 rotates relative to the rear link rod 31, the rotation seat 33 draws the draw cord 72 to drive the locking assembly 6 for unlocking. When the locking assembly 6 of the stroller of the present disclosure is unlocked for folding, the draw cord 72 pulls the slider block 71 on the second link rod 42 to slide relative to the first link rod 41.

According to an embodiment, the push rod 32 comprises an unlocking member 321 configured to unlock the push rod 32 by causing the push rod 32 to rotate with respect to the rear link rod 31 to draw the draw cord 72. For instance, the unlocking member 321 comprises an actuation button.

When the baby stroller frame is in use, the unlocking member 321 prevents the push rod 32 to rotate relative to the rear link rod 31 and the baby stroller frame is deployed to a state shown in FIG. 1.

Figure 2:
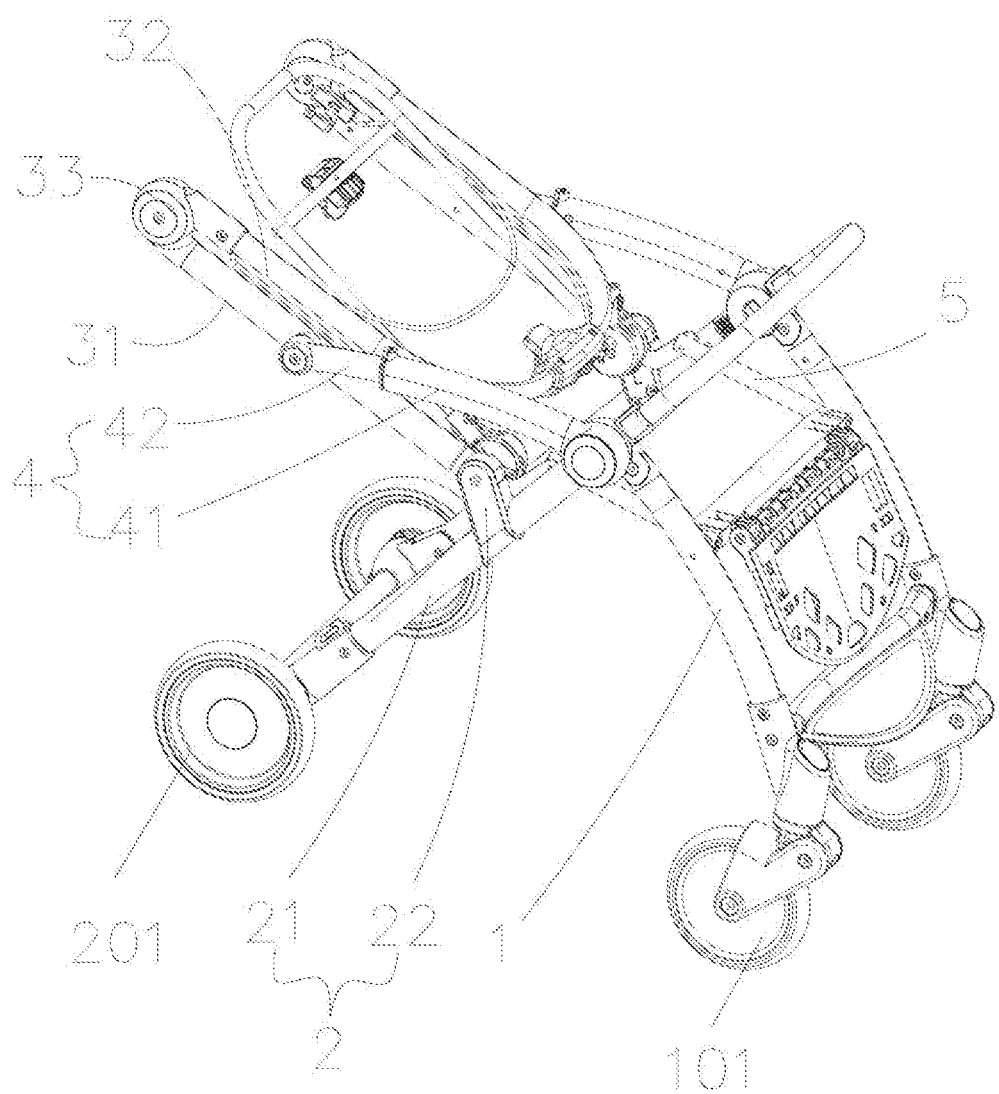
FIG. 2 shows the baby stroller frame of FIG. 1 when being folded.
Figure 3:
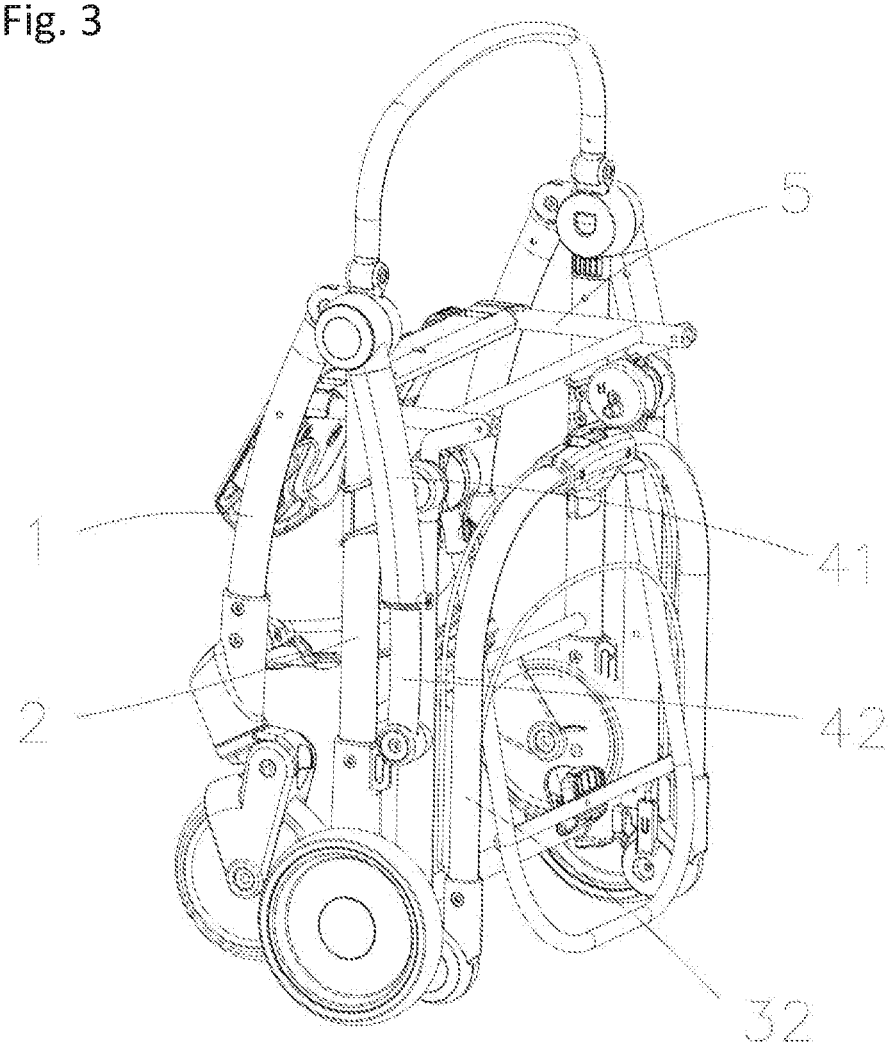
FIG. 3 shows the baby stroller frame of FIG. 1 in a folded state.
Figure 4:
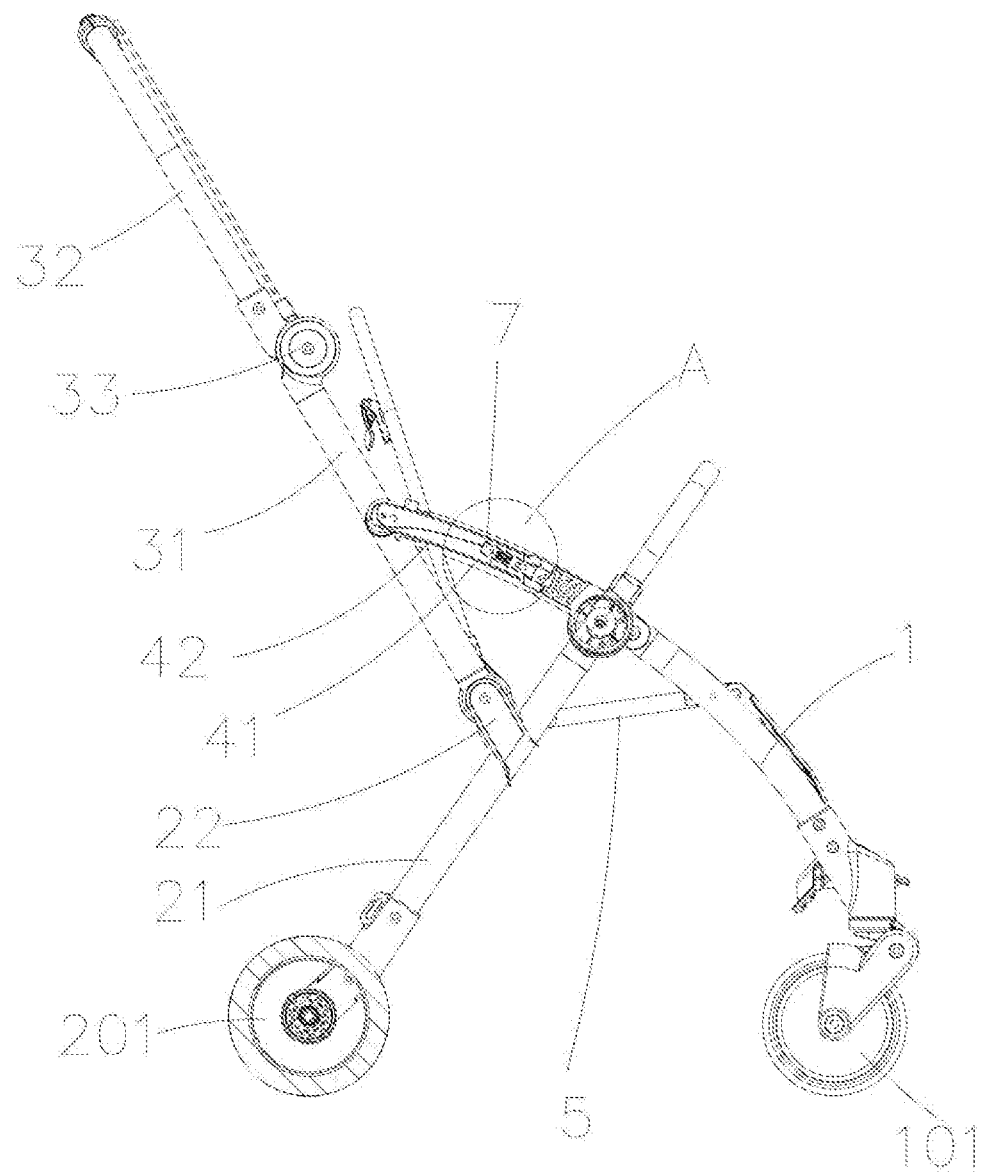
FIG. 4 shows a side view of the baby stroller frame of FIG. 1 with the locking assembly in a locked state.
Figure 5:
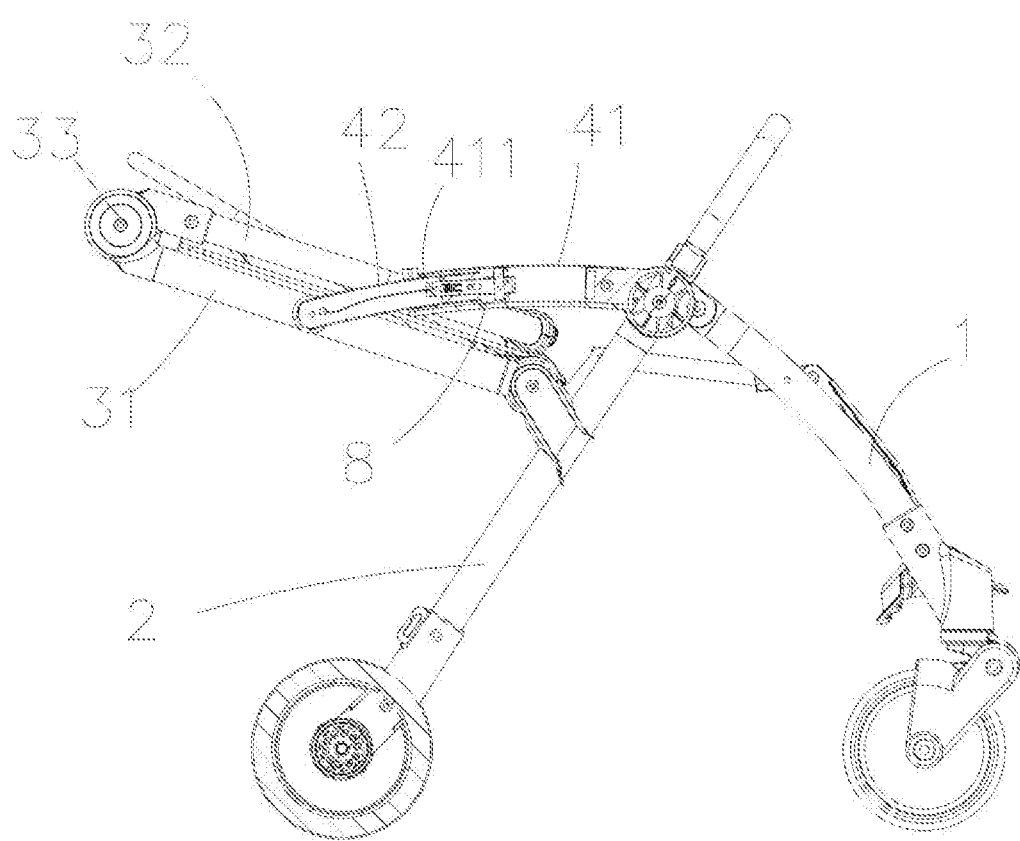
FIG. 5 shows a side view of the baby stroller frame of FIG. 1 with the locking assembly in an unlocked state.
Figure 6:
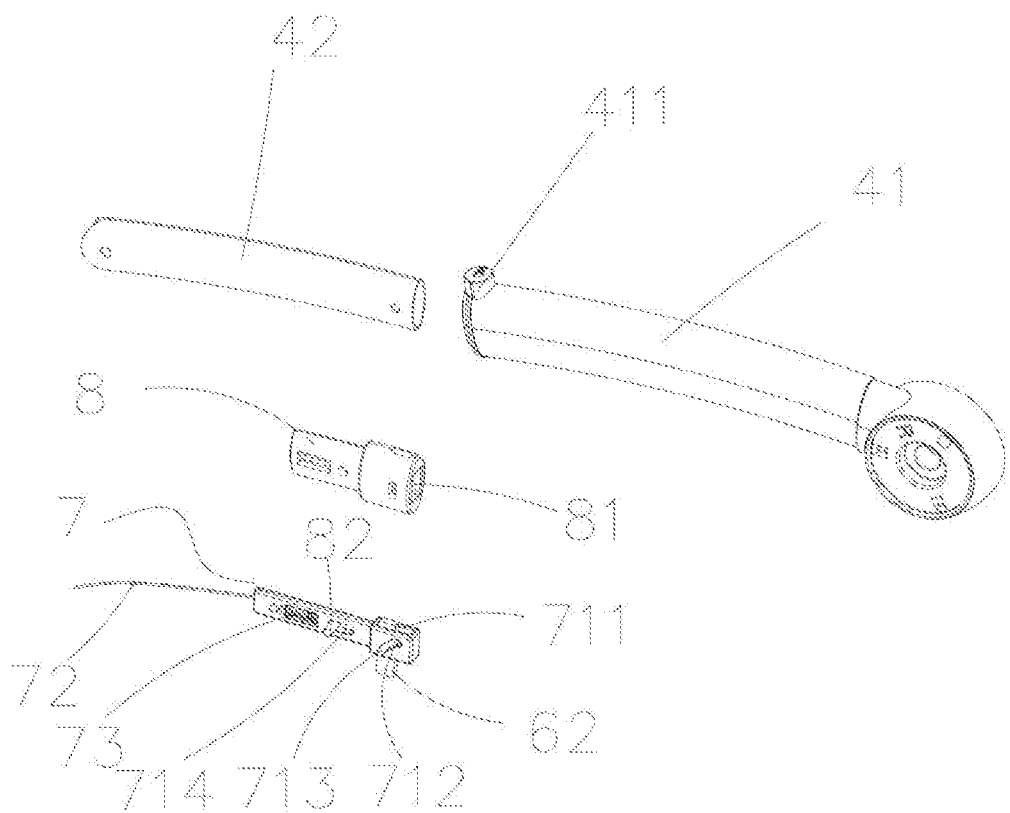
FIG. 6 shows an embodiment of a front support rod of the baby stroller frame according to the present disclosure in an exploded view.
Figure 7:
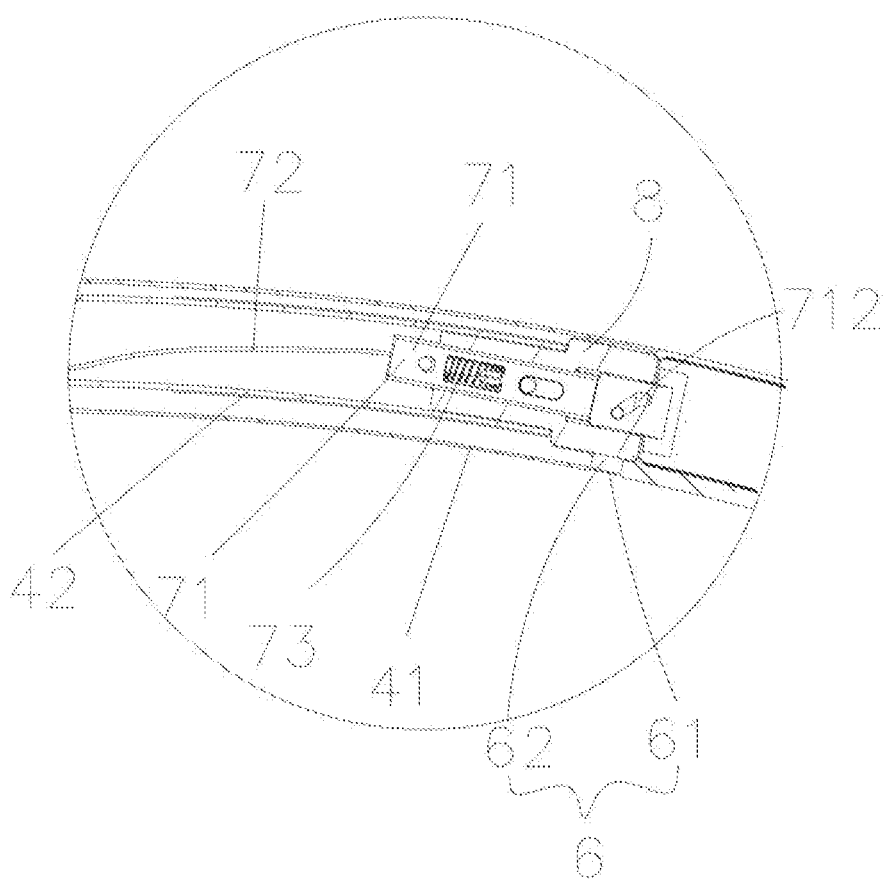
FIG. 7 shows an enlarged view of pail A of FIG. 4.

When the baby stroller frame needs to be folded, it is only needed to operate the unlocking member 321 to unlock the push rod 32 and cause the push rod 32 to rotate with respect to the rear link rod 31, thereby realizing automatically folding to a state shown in FIG. 2. At that time, the rotation seat 33 rotates to draw the draw cord 72 to move so that the lock pin 62 leaves the lock hole 61. Thus, the locking assembly 6 is in an unlocked state. The lower end of the push rod 32 and the upper end of the rear link rod 31 approach the lower end of the rear leg rod 2, so that the draw cord 72 pulls the slider block 71 on the second link rod 42 to slide with respect to the first link rod 41, causing the end of the second link rod 42 connected to the rear link rod 31 to approach the lower end of the rear leg rod 2, too. The lower end of the rear link rod 31 rotates about a center of rotation to a position where the rear link rod 31 is rotatably connected to the protrusion portion 22 and drives the seat rod 5 to move. Meanwhile, the other end of the seat rod 5 drives the front leg rod 1 to move towards the direction of the rear leg rod 2, so as to fold the stroller to a state shown in FIG. 3. After the stroller of the present disclosure is folded, the stroller is configured to stand upright with the front wheel 101 and the rear wheel 201 as the bearing points, saving the floor space. A parent holding a child may fold the stroller by one hand. Moreover, after the stroller is folded, the stroller frame is configured to stand automatically, enabling one to walk with the stroller frame held in the hand, without additional operation. The operation is simple, realizing folding and deploying by one hand, which is very convenient.

The invention claimed is:

1. A baby stroller frame comprising:
a front leg rod,
a front wheel connected to a lower end of the front leg rod,
a rear leg rod,
a rear wheel connected to a lower end of the rear leg rod, an upper end of the front leg rod being rotatably connected with an upper end of the rear leg rod,
a handle set comprising a rear link rod, the rear link rod being rotatably connected to the rear leg rod at a position close to a lower end of the rear link rod,
a front support rod comprising a first link rod and a second link rod slidably connected to the first link rod, the first link rod being rotatably connected to the upper end of the rear leg rod or to the upper end of the front leg rod, the second link rod being rotatably connected to the rear link rod,
a seat rod having one end rotatably connected to the rear link rod and one other end rotatably connected to a middle portion of the front leg rod.

2. The baby stroller frame according to claim 1, further comprising:
a locking assembly provided between the first link rod and the second link rod for locking the first link rod and the second link rod, the locking assembly comprising a lock hole in the first link rod and a lock pin in the second link rod, the lock pin matching the lock hole,
a drive assembly configured to drive the lock pin to move in the lock hole.

3. The baby stroller frame according to claim 2, wherein the drive assembly comprises:
a slider block comprising a sliding groove for the lock pin to slide therein, the slider block further comprising a chute through the sliding groove, the lock pin comprising a first column inserted into the chute,
a draw cord connected to one end of the slider block,
a spring configured to drive the slider block to reset.

4. The baby stroller frame according to claim 3, further comprising:
a restriction block at the second link rod for preventing the second link rod from dropping off the first link rod, the restriction block comprising a runway for the slider block to slide therein, the slider block having a bar-shaped hole, the restriction block further comprising a second column inserted into the bar-shaped hole and connecting the slider block to the restriction block, the spring having one end fixed to the slider block and one other end abutting against the restriction block.

5. The baby stroller frame according to claim 4, wherein the first link rod comprises at an end portion a stopper block configured to abut against the restriction block and configured to prevent the second link rod from dropping off the first link rod.

6. The baby stroller frame according to claim 1, wherein the handle set further comprises a U-shaped push rod rotatably provided on the upper end of the rear link rod.

7. The baby stroller frame according to claim 6, wherein the handle set comprises a rotation seat between the push rod and the rear link rod, one other end of the draw cord being connected to the rotation seat.

8. The baby stroller frame according to claim 7, wherein the push rod comprises an unlocking member configured to unlock the push rod by causing the push rod to rotate with respect to the rear link rod to draw the draw cord.

9. The baby stroller frame according to claim 1, wherein the rear leg rod comprises a rear leg link rod and a protrusion portion provided on the middle portion of the rear leg link rod, the rear link rod being rotatably connected to the protrusion portion at a position close to the lower end of the rear link rod, the rear wheel being connected to the lower end of the rear leg link rod, the upper end of the rear leg link rod being connected to the upper end of the front leg rod.

* * * * *